United States Patent [19]

Karlsson

[11] 3,961,976

[45] June 8, 1976

[54] METHOD OF PREPARING SIZE

[75] Inventor: Alf Hugo Karlsson, Njurunda, Sweden

[73] Assignee: SCA Development Aktiebolag, Sundsvall, Sweden

[22] Filed: Apr. 25, 1975

[21] Appl. No.: 571,645

[30] Foreign Application Priority Data

May 17, 1974 Sweden................................ 7406630

[52] U.S. Cl............................. 106/186; 106/197 C; 260/232; 260/233
[51] Int. Cl.²........................................... C08L 1/28
[58] Field of Search ............ 106/186; 260/237 CM, 260/232, 17.3, 15

[56] References Cited
UNITED STATES PATENTS 2,487,766  11/1949  Schmidt.............................. 260/15
3,778,392  12/1973  Hughes.............................. 260/17.3

*Primary Examiner*—Theodore Morris
*Attorney, Agent, or Firm*—Lerner, David, Littenberg & Samuel

[57] ABSTRACT

An improved fuse size, as well as a method for preparing same, are disclosed. Specifically, the fuse size disclosed includes a combination of urea and carboxymethyl cellulose, preferably including added starch. The method disclosed includes combining the urea and carboxymethyl cellulose, heating the mixture, and then adding an oxidizing agent to the mixture in the presence of a metal ion which has at least two oxidation stages, but which is in the lower of said oxidation stages when added thereto. In a preferred embodiment, the oxidizing agent employed comprises hydrogen peroxide, and the metal ion is preferably bivalent iron, added in the form of a ferrous salt such as ferrous chloride.

10 Claims, No Drawings

METHOD OF PREPARING SIZE

FIELD OF THE INVENTION

The present invention relates to an improved fuse size. More specifically, the present invention also relates to a method of preparing such improved fuse size.

BACKGROUND OF THE INVENTION

Fuse size is to be understood as a size which is in a solid state at room temperature, which is usually applied in a fused or liquid state, and which upon cooling rapidly provides increased adhesive strength.

Conventional fuse sizes generally include natural materials such as waxes, resins and other rubber-like substances. More recently developed fuse sizes have been based upon more sophisticated materials such as various thermoplastics such as, for example, ethylene-vinyl-acetate copolymers.

SUMMARY OF THE INVENTION

According to one aspect of the present invention, improved fuse sizes are provided based on the combination of urea and carboxymethyl cellulose, preferably with added starch. According to the method of this invention, such a combination of urea and carboxymethyl cellulose is obtained by adding an oxidizing agent, preferably hydrogen peroxide, to that mixture, in the presence of a metal ion which has at least two oxidation stages, so that during oxidation it changes its valency by one unit, and which is added in the lower of its oxidation stages.

According to a particularly preferred embodiment of the method according to this invention, the metal ion is a bivalent iron, which is preferably added in the form of a ferrous salt, such as ferrous chloride.

DETAILED DESCRIPTION

The urea-carboxymethyl cellulose fuse size of this invention is prepared by heating a mixture of urea and carboxymethyl cellulose, with or without added starch, treating the mixture with hydrogen peroxide, and adding a metal ion of the type described above, preferably an iron (II)-salt. The heating can be carried out at temperature of up to about 100°C. The resulting product has a distinct fuse point, and shows a very high adhesive strength in adhesion tests.

Without being restricted to any specific mechanism, this process can be illustrated by way of the following sceme, wherein the cellulose molecule is designated by "Cell", with associated hydroxyl group -OH;

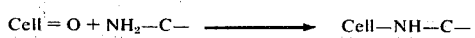

The initial mixture will preferably have a composition including from about 10% to about 90% urea. The amount of starch included therein may vary from zero up to about 87% thereof, and the amount of added carboxymethyl cellulose should be at least about 3% or more.

When bivalent iron is employed as the metal, from between about 0.5 mg $Fe^{2+}$/kg of starting material up to about 1000 mg $Fe^{2+}$/kg of the mixture should be utilized.

When the oxidizing agent employed is hydrogen peroxide, the amount employed should be at least about 2 ml/kg of the mixture (based on a 35% aqueous solution) up to about 200 ml/kg of the mixture.

The reaction may be carried out at a temperature of between about 50°–150° C, while the reaction time may vary from between about 10 minutes to about 5 hours.

The invention is thus described in greater detail in the following examples;

EXAMPLE 1:

An enshrouded planetary stirrer was charged with a mixture of 50 parts urea (500 g), 35 parts starch (350 g) and 15 parts carboxymethyl cellulose (150 g). The ingredients were thoroughly mixed, while being heated to about 60° C, and then 5.7 g of a 0.65% iron (II) chloride solution, followed by 22.7 g of a 35% hydrogen peroxide solution were added thereto. The resulting reaction, which was exothermic, was then supported by continued heating to about 130° C, and the reaction was permitted to proceed at that temperature for about 20 minutes.

The final product obtained was then tapped in a fused state and cooled at room temperature. It had the following characteristics:

Dry content: 97–98%
Fuse point: about 105° C

In order to evaluate the applicability of this product as a component in coating mixtures, the viscosity of the size was tested (utilizing a Brookfield viscosimeter, 50 rpm, 25° C) at a dry content of 53.6%. The following results were obtained:

| | Measured Immediately | after one day | after 5–6 days |
|---|---|---|---|
| Viscosity, cP | 2560 | 2930 | 2970 |

A further series of examples of the present invention were then carried out in the same general manner as Example 1, and the results are compiled in Table I.

TABLE I

| EXAMPLE | 2 | 3 | 4 | 5 | 6 | 7 | 8 | 9 | 10 | 11 |
|---|---|---|---|---|---|---|---|---|---|---|
| Urea, parts | 50 | 50 | 50 | 60 | 70 | 80 | 50 | 50 | 50 | 60 |
| Starch (Stadex P 55 or raw starch), parts | | | | | | | 35 | 35 | 35 | 30 |
| CMC* { Cellufix FF 50 | | | | 40 | | 20 | 15 | 15 | 15 | |
| Cellufix FF 5, parts | 50 | 50 | 50 | | 30 | | | | | 10 |
| Hydrogen peroxide, 35% } Iron(II)chloride, 0,65% | 1 | 2 | 1 | 1 | 1 | 1 | 1 | 1 | 2 | 1 |

TABLE I-continued

| EXAMPLE | 2 | 3 | 4 | (Examples 2-11) 5 | 6 | 7 | 8 | 9 | 10 | 11 |
|---|---|---|---|---|---|---|---|---|---|---|
| parts (1 part = 2.27 g $H_2O_2$ + 0.57 g $FeCl_3$-solution) | | | | | | | | | | |
| Reaction time, min. | 30 | 20 | 45 | 15 | 25 | 15 | 20 | 30 | 30 | 15 |
| Reaction temperature, °C | 100 | 100 | 100 | 105 | 100 | 105 | 100 | 100 | 100 | 105 |
| Dry substance, % | 30 | 33 | 39 | 97 | 47 | 97 | 49 | 50 | 41 | 97 |
| Fuse point, °C | | | 85–87 | | 90–94 | | | | | 102–105 |
| pH | 8.8 | 9.1 | 9.6 | — | 9.7 | — | 9.1 | 9.1 | 9.1 | — |
| Viscosity, cP (Brookfield, 50 rpm, 25°C) | | | | | | | | | | |
| immediately | 995 | 925 | 6715 | — | 875 | — | 1575 | 2115 | 650 | — |
| after 1 day | 1020 | 920 | — | — | — | — | 1700 | 2220 | 655 | — |
| after 5–6 days | 1120 | 1160 | 7935 | — | 980 | — | 1715 | 2190 | 650 | — |

*Carboxymethyl Cellulose

The results obtained with respect to both of the coating mixtures, as well as the paper data, are contained in Table II below.

TABLE II

| Analyses | Example 12 Intaglio printing | | | Example 13 Offset printing | |
|---|---|---|---|---|---|
| | 6 parts size According to Ex. 9 | 1.5 parts FF 20 3.5 parts Dow 670 | 6 parts Acronal ST 420 | 3 parts size According to Ex. 9, and 9 parts Dow 670 | 2 parts FF 5 10 parts Dow 670 |
| Mixture data: | | | | | |
| Before run — Dry content, % | 57.7 | 56.1 | 44.1 | 61.3 | 55.7 |
| Viscosity, cP | 1335 | 1395 | 1405 | 1440 | 1400 |
| Viscosity, 1 day, cP | 1155 | 1495 | — | 1530 | 1410 |
| Ash content, % | 83.2 | 83.2 | 82.2 | 78.1 | 77.9 |
| After run — Dry content, % | 58.5 | 56.9 | 44.9 | 62.6 | 56.5 |
| Viscosity, cP | 1435 | 1700 | 1590 | 1945 | 1625 |
| Ash content, % | 83.5 | 83.3 | 82.4 | 78.3 | 78.1 |
| Paper data: | | | | | |
| Sheet load, g | 2230 | 1000 | 500 | 2230 | 500 |
| Coat, abs.dry, g/m² | 14.4 | 16.1 | 15.1 | 15.6 | 16.2 |
| Surf. roughn., Bendtsen, 1 kP/, not calandered, ml/min | 280 | 185 | 265 | 280 | 240 |
| Surf. roughn., Parker Print, 10 kp, not calandered, ml/min | 5.52 | 4.85 | 5.15 | 5.40 | 5.40 |
| Surf. roughn., Bendtsen, 1 kp, calandered, ml/min | 34 | 20 | 26 | 32 | 18 |
| Surf. roughn., Parker Print, 10 kp, calandered, ml/min | 2.30 | 1.68 | 1.76 | 2.08 | 1.94 |
| Surf. strength, IGT, medium-viscous oil, cm/s | — | — | — | 35 | 25 |
| Surf. strength, IGT, low-viscous oil, cm/s | 6 | 20 | 10 | — | — |
| Ink absorption, K&N, % | 45.2 | 46.4 | 50.6 | 29.4 | 30.6 |
| Wet abrasion resistance, % | — | — | — | 94.3 | 88.8 |
| Brightness, % | 75.8 | 76.6 | 78.2 | 74.6 | 75.0 |
| Opacity, PO, % | 92.6 | 93.1 | 93.3 | 92.1 | 92.7 |
| Gloss, Ingersoll, % | 72.9 | 75.3 | 69.3 | 70.4 | 72.1 |

For a more complete evaluation of the practicality of applying the products obtained according to these Examples to various coating processes, coating experiments for intaglio printing were carried out with the product obtained in Example 6, and for offset printing with the product obtained in Example 9.

These coating experiments were carried out in a half-scale machine manufactured by Dixon. A wood-containing paper having a density of about 40 g/m² was employed as the raw paper therein.

For intaglio printing, a coating mixture was prepared utilizing 6 parts of the fuse size prepared according to Example 6, and 100 parts of pigment (clay). For purposes of comparison, this mixture was tested against two standard recipes, consisting of:

1. 6 parts of Acronal ST 420, and 100 parts of pigment
2. 1.5 parts of Cellufix FF20, 3.5 parts of Dow 670, and 100 parts of pigment.

For offset printing, a mixture was prepared utilizing 3 parts of the size prepared according to Example 9, 9 parts of Dow 670, and 100 parts of pigment. This mixture was compared with a standard recipe, consisting of 2 parts of Cellufix FF5, 10 parts of Dow 670, and 100 parts of pigment.

The size product prepared according to this invention is particularly suitable for use in apparatus for the sizing of paper and corrugated board, for the lamination of paper, in adhesive strips, as wallpaper paste and the like, and as a component in agents for paper coating.

I claim:

1. A method of preparing fuse size which comprises combining carboxymethyl cellulose and urea, heating said combination, and adding an oxidizing agent to said heated combination in the presence of a metal ion, said metal ion having at least two oxidation stages and being in the lower of said two oxidation stages.

2. The method of claim 1 wherein said oxidizing agent comprises hydrogen peroxide.

3. The method of claim 1 wherein said metal ion is bivalent.

4. The method of claim 3 in which said bivalent metal ion comprises iron.

5. The method of claim 4 wherein said bivalent ion comprises ferrous chloride.

6. The method of claim 1, including adding starch to said combination of said carboxymethyl cellulose and said urea.

7. The method of claim 1 wherein said heating is carried out at a temperature of about 100° C.

8. The method of claim 1, including more than about 3% of said carboxymethyl cellulose in said combination of said carboxymethyl cellulose and said urea.

9. An improved fuse size comprising a combination of carboxymethyl cellulose and urea, said urea being present in an amount of between about 10% and 90%, and such carboxymethyl cellulose being present in an amount of greater than about 3%.

10. The fuse size of claim 9, including up to about 87% starch.

* * * * *